(12) United States Patent
Mertala et al.

(10) Patent No.: US 9,340,395 B2
(45) Date of Patent: May 17, 2016

(54) METHOD FOR REEVING AN ELEVATOR AND INSTALLING AN OVERSPEED GOVERNOR ROPE OR A TRAILING CABLE

(75) Inventors: Antti Mertala, Hyvinkää (FI); Marko Lehtonen, Riihimäki (FI)

(73) Assignee: KONE CORPORATION, Helsinki (FI)

( * ) Notice: Subject to any disclaimer, the term of this patent is extended or adjusted under 35 U.S.C. 154(b) by 788 days.

(21) Appl. No.: 13/344,205

(22) Filed: Jan. 5, 2012

(65) Prior Publication Data

US 2012/0124807 A1    May 24, 2012

Related U.S. Application Data

(63) Continuation of application No. PCT/FI2010/000050, filed on Aug. 4, 2010.

(30) Foreign Application Priority Data

Aug. 28, 2009 (FI) ...................... 20090310

(51) Int. Cl.
| | |
|---|---|
| *B66B 19/02* | (2006.01) |
| *B66B 19/00* | (2006.01) |
| *B23P 15/00* | (2006.01) |
| *B66D 1/30* | (2006.01) |

(52) U.S. Cl.
CPC .................. *B66B 19/00* (2013.01); *B23P 15/00* (2013.01); *B66B 19/02* (2013.01); *B66D 1/30* (2013.01)

(58) Field of Classification Search
CPC ...... B66B 11/008; B66B 19/04; B66B 19/02; B66B 19/00; B66B 15/02; B66B 5/24; B66B 5/12; B23P 15/00; B66F 7/00; B66D 2700/02; B66D 3/06; B66D 3/04; B66D 1/30; B66D 1/20; B66D 1/00; B66D 2700/026
See application file for complete search history.

(56) References Cited

U.S. PATENT DOCUMENTS

| | | |
|---|---|---|
| 2008/0116014 A1 | 5/2008 | Ach |
| 2010/0163348 A1* | 7/2010 | Barneman ..................... 187/266 |

FOREIGN PATENT DOCUMENTS

| | | |
|---|---|---|
| JP | 11246144 A | 9/1999 |
| JP | 2008207901 A | 9/2008 |
| JP | 2008308248 A | 12/2008 |
| WO | WO-2007128859 A1 | 11/2007 |

OTHER PUBLICATIONS

International Search Report.
Extended European Search Report issued in European Application No. 10811320, dated Jan. 21, 2016.

* cited by examiner

*Primary Examiner* — Jermie Cozart
(74) *Attorney, Agent, or Firm* — Harness, Dickey & Pierce, P.L.C.

(57) ABSTRACT

In a method for reeving an elevator, a hoisting element of a hoisting device is fixed to a first lifting point, and the hoisting element of the hoisting device is fixed to a second lifting point of the hoisting rope. The hoisting rope is lifted in the elevator hoistway with the hoisting device until the first lifting point and the second lifting point are at the top part of the elevator hoistway. The first end of the hoisting rope is guided to a first fixing point, and the second end of the hoisting rope is guided to a second fixing point. The first end is fixed to a first fixing point and the second end is fixed to the second fixing point.

18 Claims, 3 Drawing Sheets

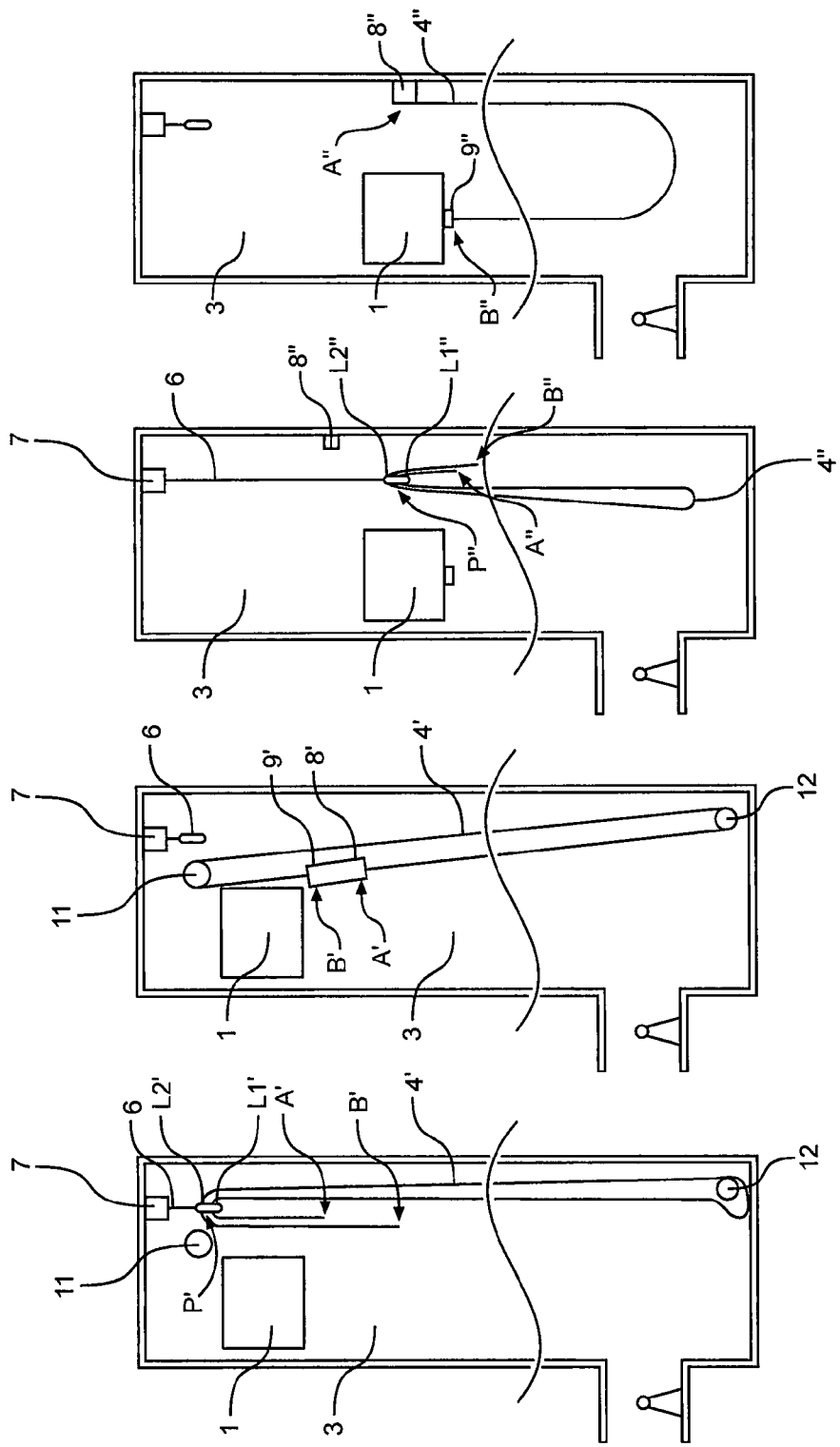

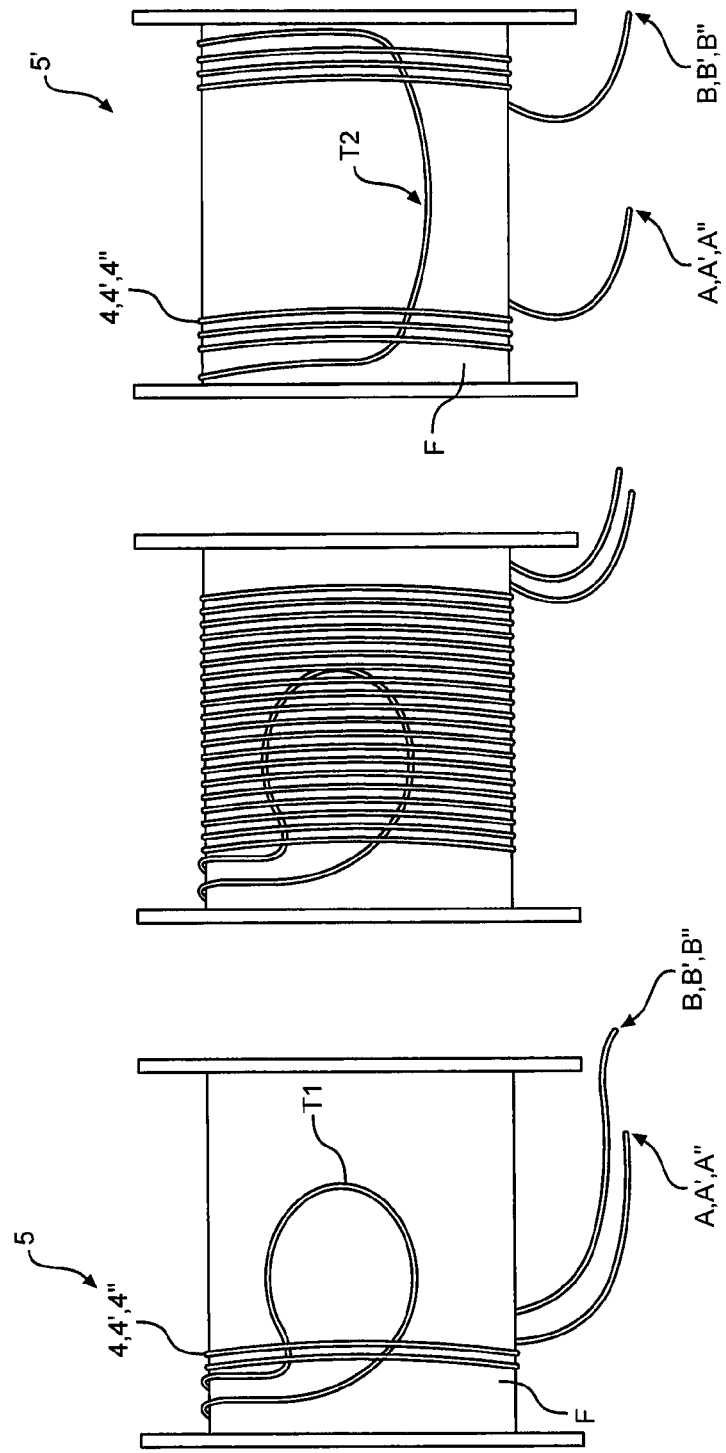

Figure 1:
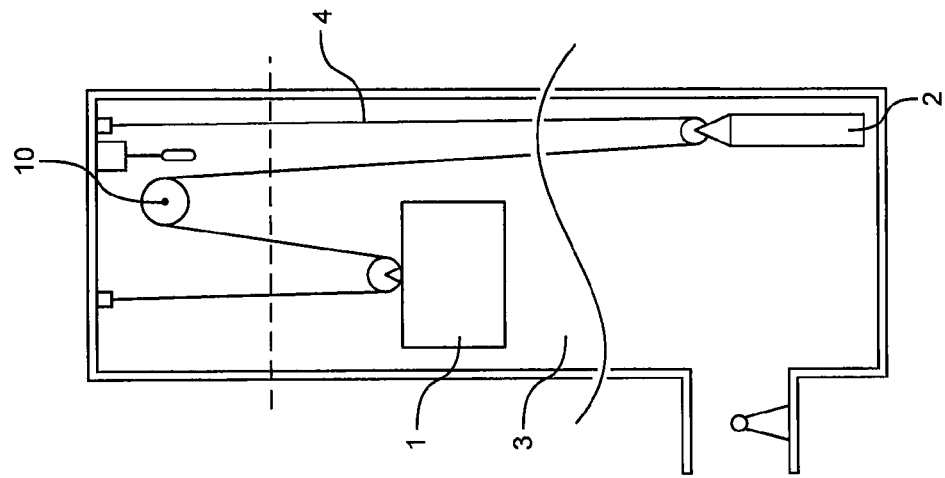

METHOD FOR REEVING AN ELEVATOR AND INSTALLING AN OVERSPEED GOVERNOR ROPE OR A TRAILING CABLE

CROSS-REFERENCE TO RELATED APPLICATIONS

This application is a continuation of PCT/FI2010/000050 filed on Aug. 4, 2010, which is an international application and claims priority from FI 20090310 filed on Aug. 28, 2009, the entire contents of each of which are hereby incorporated by reference.

FIELD OF THE INVENTION

The object of the invention is a method for reeving an elevator, a rope reel, and a method for installing an overspeed governor rope or a trailing cable.

BACKGROUND OF THE INVENTION

The hoisting roping of an elevator comprises one or more hoisting ropes, which are arranged to move the elevator car and possibly also a counterweight. When reeving an elevator, it is known in the art that each rope of the hoisting roping is arranged into its position by threading it end first through the diverting pulley set of the elevator and by fixing the ends of the rope into their position in the elevator hoistway or on the elevator car, depending on the suspension arrangement. One prior-art method to do this is to lower the rope end first into the elevator hoistway e.g. to the counterweight from the machine room. However, this is awkward because a supple hoisting rope cannot be lowered by supporting it from its end, since as the end descends downwards the mass of the top parts of the supported end would start to uncontrollably pull additional rope from the reel. For this reason the lowering of the rope must be braked in other ways, although at the same time, however, the end of the rope must also be controlled. The arrangement is complex, slow and expensive to implement. Another reeving method is to guide the rope into its position end first by pulling the rope with a hoisting device from a rope reel that is in the bottom part of the elevator hoistway. Thus the rope can be guided end first to pass through the pulley sets of the elevator system such that the end of the rope is released last from the rope reel and the whole rope is finally pulled into position. One problem of this solution is the large rope weights. Pulling a rope through the whole system is awkward and requires high capacity from the pulling apparatus. Likewise, the deadweight of the rope may endeavor to pull the rope back, so that the rope must always be locked into its position e.g. during the transfer of a pulling device or of a pulling point. The problems described above occur particularly when reeving an elevator, the counterweight and/or elevator car of which is suspended differently to a 1:1 suspension ratio, e.g. with a 1:2 suspension ratio, because the path of passage of the ropes of the elevator is in this case conducted upwards and downwards and generally comprises a number of diverting pulleys, which circumstances make lifting the hoisting rope into its position more complicated. There can be a need to perform a number of lifting phases, which lengthens the time needed for reeving.

OBJECT OF THE INVENTION

The object of the invention is to eliminate, among others, the aforementioned drawbacks of prior-art solutions. More particularly the aim of the invention is to produce an improved rope reel and methods for reeving an elevator. The purpose of the invention is further to produce one or more of the following advantages, among others:

A method and a rope reel are achieved, using which the hoisting rope can be installed into the elevator safely and simply.

A method and a rope reel are achieved, using which the tendency of the deadweight of the rope to be installed to pull itself out of the system is less than before.

A method and a rope reel are achieved, using which the ropes can be installed quickly and simply, e.g. because the rope lengths can be fitted to be suitable in an early stage and in good circumstances. Unnecessary work and moving of rope masses is less than before.

A method and a rope reel are achieved, using which it is possible to get the ropes to extend from the bottom parts to the top parts of the elevator hoistway simply and with a small number of lifts.

A fast and efficient method for installing the overspeed governor rope or the trailing cable of an elevator is achieved.

SUMMARY OF THE INVENTION

The method according to the invention in replacing the hoisting roping of an elevator can be defined to be characterized by what is disclosed herein. The rope reel according to the invention can be defined to be characterized by what is disclosed herein. The method according to the invention for installing an overspeed governor rope or a trailing cable can be defined to be characterized by what is disclosed herein. Other embodiments of the invention can be defined to be characterized by what is disclosed in the other claims. Some inventive embodiments are also presented in the descriptive section and in the drawings of the present application. The inventive content of the application can also be defined differently than in the claims presented below. The inventive content may also consist of several separate inventions, especially if the invention is considered in the light of expressions or implicit sub-tasks or from the point of view of advantages or categories of advantages achieved. In this case, some of the attributes contained in the claims below may be superfluous from the point of view of separate inventive concepts. The features of the various embodiments can be applied within the framework of the basic inventive concept in conjunction with other embodiments. The additional procedures/additional features of the invention defined in the non-independent claims could also be regarded separately from the procedures of an independent claim as separate inventions in their own right.

In the method according to the invention for reeving an elevator the hoisting means of a hoisting device is fixed to a first lifting point, which is at the first end of the rope or at a distance from the first end, and the hoisting means is fixed to the second lifting point of the hoisting rope, which is at the second end of the aforementioned rope or at a distance from the second end, and the rope is lifted in the elevator hoistway by lifting the rope with the aforementioned hoisting device from the first lifting point and from the second lifting point, most preferably simultaneously, until the first lifting point and second lifting point are in the top part (point P) of the elevator hoistway, and the first end and second end of the rope are guided to their fixing points, and the ends are fixed to their fixing points. One advantage is that guiding the ends of the rope onwards to their fixing points is simple, e.g. because with a hoisting device the large mass of the rope, which is formed from the loop of rope between the lifting points, can be supported easily.

In one embodiment of the invention during a lift the section of rope between the lifting points is released from the rope reel or from some other rope storage. By supplying it this way, straightening of the rope in the hoistway is simple, space-efficient and fast.

In one embodiment of the invention the first lifting point is at the first end of the rope or at a first distance from the first end of the rope and the second lifting point is at a second distance from the second end of the rope, which second distance is essentially greater than the first distance. One advantage is that the rope lengths are already in an early phase of the method advantageous and can be fitted to be the correct lengths with respect to the follow-on of the method. This is particularly advantageous in an elevator, in which the paths of passage of the rope sections of the rope on different sides of the diverting pulley of the counterweight from the diverting pulley of the counterweight to their fixing points are of different lengths.

In one embodiment of the invention the lengths of the path of passage of the rope from the point P, at which point the lifting point of the rope is when the rope has been lifted upwards in the elevator hoistway, to the fixing points are determined in advance before a lift, and the distances between the lifting points and the ends are selected based on the aforementioned lengths of the path of passage. Fitting the rope lengths to be advantageous in this way even before the lift facilitates operation after the lift, because the tail of the rope can be so long that the end reaches its fixing point after the lifting. One advantage is that on the basis of the determination the longer distances between the lifting points and the ends can be selected the longer the path of passage from the point P to each lifting point is.

In one embodiment of the invention the section of rope on the side of the second end is guided after the lift to pass via a diverting pulley supported on the building, e.g. in the elevator hoistway or in the machine room, which diverting pulley is preferably a traction sheave, downwards to the elevator car and the second end is fixed to the elevator car or the aforementioned section of rope is guided onwards, via a diverting pulley on the elevator car, upwards and the second end of the rope is fixed to a fixing point in the elevator hoistway or in the machine room.

In one embodiment of the invention at least the first end or the second end of the rope, preferably both, are fixed to their fixing points in the top part of the elevator hoistway or in the machine room.

In one embodiment of the invention the elevator car and/or the counterweight is supported in the finished elevator to be manufactured with the method with the aforementioned hoisting rope with a suspension that differs to a 1:2 suspension ratio, preferably with a 1:2 suspension.

In one embodiment of the invention the section of rope between the lifting points is guided to pass via the diverting pulley of the counterweight, preferably before lifting the rope to the top part of the elevator hoistway.

In one embodiment of the invention during a lift the first end and the second end rise upwards in the elevator hoistway, and at the same time the section of rope between the lifting points is released from the rope reel or from some other rope storage.

In one embodiment of the invention the counterweight is in the bottom part of the elevator hoistway, in which case the elevator car is preferably in the top part of the elevator hoistway. One advantage is that the ropes can quickly be led via the counterweight and after the lift the second end can be lowered to the nearby elevator car.

In one embodiment of the invention both the lifting points are lifted simultaneously with the same hoisting means. The hoisting device can be e.g. a Tirak hoist or corresponding. The hoisting means of the hoisting device preferably comprises a hoisting rope or corresponding, to which are connected means for fixing to one or more ropes or to a point of a rope. The rope can be fixable to a hoisting means in this way e.g. with screw tightening. The means connected to the hoisting rope of the hoisting means for fixing to the rope can be a part of a hoisting cradle, which comprises guides for guiding the cradle to follow the guide rails, preferably the guide rails of the counterweight, supported by the guide rails in the elevator hoistway. The hoisting cradle can be moved with the rope, or corresponding, of the hoisting device for lifting one or more ropes simultaneously upwards in the elevator hoistway.

In one embodiment of the invention both the lifting points are lifted simultaneously with different hoisting means (preferably of the same hoisting device).

In one embodiment of the invention the first end is fixed to its fixing point on a fixed structure of the building, such as to the elevator hoistway or machine room, before detachment of the first lifting point of the rope from the support of the hoisting means. One advantage is simplicity and speed, because additional support for the rope is not needed. In this case preferably the first lifting point is at a distance from the first end of the rope, which distance is preferably small, most preferably essentially the distance from the point P to the fixing point of the first end of the rope. In this embodiment the elevator is preferably such that the rope passes in the final elevator from the diverting pulley of the counterweight upwards directly to its fixing point without passing via diverting pulleys.

In one embodiment of the invention before detachment of the second lifting point of the rope from the support of the hoisting means, the second end is guided over the traction sheave to the elevator car and preferably also fixed to its fixing point, which fixing point is on the elevator car or on a fixed structure of the building such as e.g. in the elevator hoistway or in the machine room, depending on the suspension ratio. One advantage is simplicity and speed, because additional support for the rope is not needed to prevent the deadweight of the rope from pulling the rope back downwards in the elevator hoistway.

In one embodiment of the invention during a lift rope is released from the rope reel, which rope reel is preferably disposed in the proximity of the bottom end of the elevator hoistway, preferably on the first floor landing.

In one embodiment of the invention during a lift rope is released from the rope reel, which rope reel is preferably rotating in a stationary position during the lift.

In one embodiment of the invention the second distance is at least equal in length to, preferably essentially the same as, the length of the intended path of passage of the rope from the diverting pulley supported on the building, e.g. in the top part of the elevator hoistway or in the machine room, to its fixing point. In this case one advantage is that the tail of the rope reaches its fixing point without additional lifts and the rope can be kept supported by the hoisting means until the second end is fixed to its fixing point.

In one embodiment of the invention the aforementioned diverting pulley is a traction sheave.

According to the invention, the rope reel of the elevator comprises at least one rope of the elevator, preferably a hoisting rope, which rope comprises a first end and a second end, and a bending between these, and which rope is reeled onto a roll such that the sections of rope on different sides of the bending pass around the reel a plurality of turns in the same direction. The rotation direction is understood to refer to the direction of rotation of the rope, according to which the rope on the roll rotates from the direction of bending towards the end of the rope (clockwise or counterclockwise).

In one embodiment of the invention the rope is reeled onto the roll such that when discharging rope from the reel by rotating the reel in one direction, the length of the section of rope between the coil and the first end of the rope and the length of the section of rope on the side of the coil and the second end of the rope simultaneously increase.

In one embodiment of the invention the distance between the bending and the first end is essentially smaller than the distance between the bending and the second end.

In one embodiment of the invention the rope is reeled onto the roll starting from the section between the ends of the rope.

In one embodiment of the invention the sections of rope on different sides of the bending are guided from the point of bending to pass around the reel in the same rotation directions.

In one embodiment of the invention the rope is reeled onto the roll such that the bending between the ends of the rope forms a loop.

In one embodiment of the invention the rope is reeled such that the tails of the rope are reeled onto the roll last.

In one embodiment of the invention the rope is reeled such that the bending point is placed against the frame of the reel, after which the sections of rope between the bending point and the ends of the rope are reeled onto the roll by rotating the roll in one direction.

In one embodiment of the invention the rope is reeled such that the bending point is placed against the frame of the reel, after which the sections of rope between the bending point and the ends of the rope are reeled onto the roll as a bundle.

In one embodiment of the invention the tails of the rope are released from the roll at the same time as the reel is reeled open in one direction.

In one embodiment of the invention the rope is reeled onto the roll by bending the section between the ends of the rope into a loop and by reeling the bending point of the loop onto the roll first, after which the sections of rope between the bending point and the ends are simultaneously reeled onto the roll by rotating in one direction.

In one embodiment of the invention the rope is reeled onto the roll by placing the bending point against the frame of the reel and by starting to reel the sections of rope between the bending point and the ends such that the sections of rope between the bending point and the ends pass over the bending point pressing the bending point against the frame of the roll.

In one embodiment of the invention the rope is reeled onto the roll by guiding the sections of rope on different sides from the bending point to pass around the reel a plurality of turns as a bundle, preferable resting against each other.

In one embodiment of the invention the rope is reeled onto the roll by guiding the sections of rope on different sides from the bending point to pass around the reel separately from each other such that they pass around the reel a plurality of turns at a distance from each other.

In one embodiment of the invention the rope is a metal braided rope.

In one embodiment of the invention the rope is an overspeed governor rope or a hoisting rope or rope (trailing cable) of an elevator, which comprises an information transfer channel and/or electricity transfer channel such as e.g. an insulated metal conductor.

In one embodiment of the invention the aforementioned rope reel is a rope reel for bringing the rope of an elevator to the proximity of the elevator, for installing the rope into the elevator.

In the method according to the invention for installing the overspeed governor rope or trailing cable of an elevator into an elevator, the ends of the overspeed governor rope or trailing cable of the elevator are guided to their fixing points and the ends are fixed to their fixing points. In the method the hoisting means of a hoisting device is fixed to the first lifting point, which is at the first end of the overspeed governor rope or trailing cable or at a distance from the first end, and the hoisting means is fixed to the second lifting point, which is at the second end of the aforementioned overspeed governor rope or trailing cable or at a distance from the second end, and the overspeed governor rope or trailing cable is lifted in the elevator hoistway by lifting the overspeed governor rope or trailing cable with the aforementioned hoisting device from the first lifting point and from the second lifting point simultaneously until the first lifting point and the second lifting point are at the desired height in the elevator hoistway (point P',P''), and the first end and second end of the overspeed governor rope or trailing cable are guided to their fixing points, and the ends are fixed to their fixing points.

In one embodiment of the invention the first lifting point is at the first end of the overspeed governor rope or trailing cable or at a first distance from the first end and the second lifting point is at a second distance from the second end, which second distance is essentially greater than the first distance.

In one embodiment of the invention the lengths of the path of passage of the overspeed governor rope or of the trailing cable from the point P, at which point the lifting point of the overspeed governor rope or of the trailing cable is when the overspeed governor rope or the trailing cable has been lifted upwards to the desired height in the elevator hoistway, to the fixing points, are determined before a lift, e.g. by estimating and/or by measuring, and the distances between the lifting points and the ends are selected based on the aforementioned lengths of the path of passage.

In one embodiment of the invention during a lift the section of rope between the lifting points is released from the rope reel or from some other rope storage.

In one embodiment of the invention during a lift the first end and the second end rise upwards in the elevator hoistway.

In one embodiment of the invention during a lift the first end and the second end rise upwards in the elevator hoistway, and at the same time the section of rope between the lifting points is released from the rope reel or from some other rope storage.

LIST OF FIGURES

Figure 2:
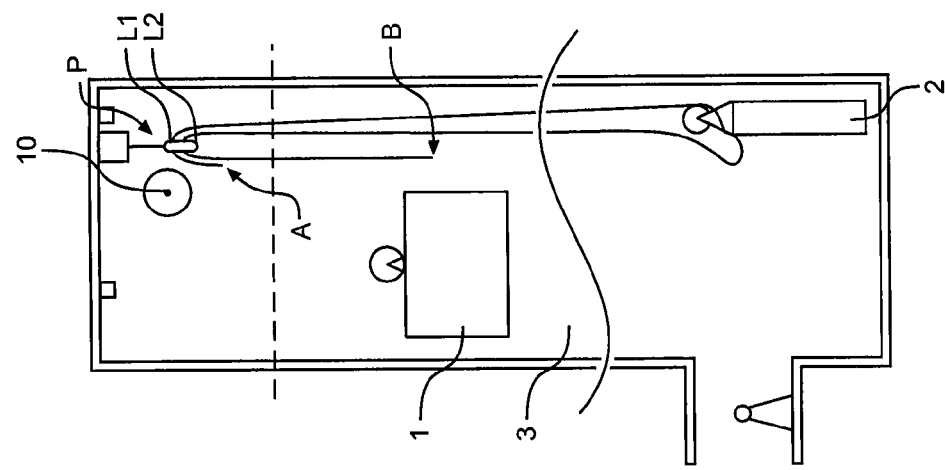
Figure 3:
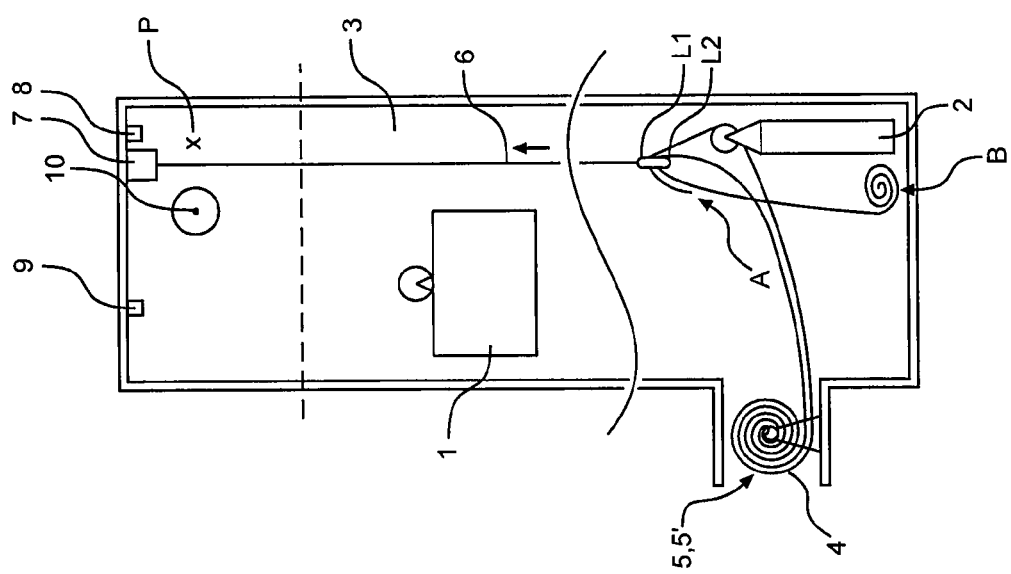

In the following, the invention will be described in detail by the aid of some examples of its embodiment with reference to the attached drawings, wherein FIGS. 1-3 present situations in different phases of the method (for reeving an elevator with a hoisting rope) according to the invention in the sequence in which the method is performed.

FIGS. 4-5 present situations in different phases of the method (for installing an overspeed governor rope) according to the invention in the sequence in which the method is performed.

FIGS. 6-7 present situations in different phases of the method (for installing a trailing cable) according to the invention in the sequence in which the method is performed.

FIG. 8 presents one embodiment of a rope reel according to the invention.

FIG. 9 presents a rope reel according to FIG. 8, onto which more rope than in FIG. 8 has been reeled.

FIG. 10 presents a second embodiment of a rope reel according to the invention.

DETAILED DESCRIPTION OF THE INVENTION

FIG. 1 presents a phase of the method according to the invention for reeving an elevator, which elevator comprises an elevator car 1. The elevator car 1 and the counterweight 2 are arranged at a certain height in the elevator hoistway or corresponding. The hoisting rope 4 of the elevator is brought to the proximity of the elevator as a rope reel, from which both tails of the rope diverge. In the phase presented, the rope or a corresponding hoisting means 6 of the hoisting device 7 supported on the top parts of the elevator hoistway is connected to the hoisting rope 4 to be installed in the elevator. The hoisting means 6 is fixed in this case to the rope 4 to a first lifting point L1, which is at a first distance from the first end A as measured along the longitudinal axis of the rope. The same hoisting means 6 is additionally fixed to a second lifting point L2 of the hoisting rope 4, which is at a second distance from the second end B of the aforementioned rope as measured along the longitudinal axis of the rope. The rope is preferably guided in this phase also to pass around the diverting pulley of the counterweight, because in this phase the rope can be threaded onto the diverting pulley of the counterweight end (e.g. end A) first, but this procedure can, if necessary, be also performed later e.g. by guiding the section of rope between the ends A and B of the rope into the diverting pulley structure, to be opened, as a loop.

Before a lift it is advantageous to determine the lengths of the path of passage of the rope 4 (e.g. by estimating or by measuring) from the point P, at which point the lifting point (L1,L2) of the rope 4 will be when the rope 4 has been lifted upwards in the elevator hoistway 3, to the fixing points (8 and 9). The path of passage refers here to the path, along which the rope 4 must be guided so that it passes via the necessary elevator components (diverting pulleys, traction sheave, etc.). After this the distances between the lifting points (L1,L2) and the ends (A,B) can be selected based on the aforementioned lengths of the path of passage. In this way the tails of the rope are essentially the right lengths immediately when the ropes have been lifted upwards in the elevator hoistway and they are easy to guide to their fixing points without pulling additional rope. This dimensioning principle is advantageous particularly when the path of passage is essentially a different length from the point P to the fixing point 8 than to the fixing point 9.

FIG. 2 presents the subsequent phase of the method. The rope 4 is lifted in the elevator hoistway by lifting the rope with the aforementioned hoisting device 7 from the first lifting point L1 and from the second lifting point L2 until the lifting points (L1,L2) are in the top part of the elevator hoistway. In this way the rope can be lifted from the first and the second lifting point simultaneously. When the lifting points are in the top part of the elevator hoistway, the tails remaining on the second side of the lifting point hang free. The second distance between the end B of the rope and the second lifting point is preferably at least equal in length to the length of the intended path of passage of the rope from the diverting pulley 10 in the top part of the elevator hoistway (on the elevator car side as viewed from the diverting pulley) to its fixing point 9. In this case the end B of the rope is easy to guide to its fixing point with a small number of lifts, quickly and simply. Correspondingly the first distance between the first end A of the rope and the first lifting point is selected to be advantageous, e.g. to be such that additional lifts will not be required. The first length is preferably of at least the same magnitude as the distance from the first lifting point to the fixing point 9 of the first end of the rope when the first lifting point has been lifted to the top part (point P) of the elevator hoistway. During a lift the first end A and the second end B rise upwards in the elevator hoistway, and the section of rope between the lifting points is released from the rope reel 5,5' (or alternatively from a corresponding rope storage). The rope reel 5,5' is during a lift preferably rotating in a stationary location and is disposed in the proximity of the bottom end of the elevator hoistway, preferably on the first floor landing. The rope reel is preferably according to what is described in connection with FIGS. 8-10 and/or required with regard to the rope reel.

FIG. 3 presents the end result of the subsequent phase of the method, in which phase of the method each end A,B of the rope is guided after a lift to its fixing point 8,9 and fixed to it. The rope is guided over the diverting pulley 10, which is preferably a traction sheave that transmits the lifting force of the elevator to the rope, and to the elevator car 1. When the intended suspension of the elevator car is 1:2, the rope is guided below the diverting pulley of the elevator car and upwards in the elevator hoistway or corresponding to its fixing point 9. Alternatively, if the suspension intended for the elevator were 1:1, the end B of the rope 4 would be fixed to a fixing point on the elevator car 1, in which case the length of the rope between the end B of the rope 4 and the lifting point L2 would earlier be fitted to be advantageous, most preferably at least essentially as great as the distance from the diverting pulley 10 to the fixing point on the elevator car. In this phase of the method the rope 4 is additionally tightened to its desired final tautness by pulling the slack out. The elevator/roping of the elevator to be achieved with the reeving method is according to FIG. 3.

In the method for installing the overspeed governor rope 4' of an elevator into the elevator, the hoisting means 6 of the hoisting device 7 presented in FIG. 1 is correspondingly fixed to a first lifting point L1', which is at a distance from the first end A' (but could also alternatively be right at the end of the overspeed governor rope), and the hoisting means 6 is fixed to a second fixing point L2' of the rope 4', which fixing point is at a distance from the second end B' (but could also alternatively be right at the end of the overspeed governor rope). FIG. 4 presents the subsequent phase of the method, in which the overspeed governor rope 4' is lifted in the elevator hoistway 3 by lifting the overspeed governor rope with the aforementioned hoisting device from the first lifting point L1' and from the second lifting point L2' simultaneously, until the first lifting point L1' and the second lifting point L2' are at the desired height (at point P') in the elevator hoistway 3, and the first end A' and second end B' of the overspeed governor rope 4' are guided to their fixing points (8',9'), and the ends are fixed to their fixing points.

The second distance between the end B' of the rope 4' and the second lifting point L2' is preferably at least so large in length that the rope reaches from the lifting point via the diverting pulley 11 of the overspeed governor in the top part of the elevator hoistway to its fixing point 9' when the second lifting point LP2' has been lifted to the desired height (point P') in the elevator hoistway. In this case the end B' of the rope is easy to guide to its fixing point with a small number of lifts, quickly and simply. Correspondingly the first distance between the first end A' of the rope and the first lifting point is selected to be advantageous, e.g. to be such that additional lifts will not be required. The first length is in this case preferably of at least the same magnitude as the distance from the first lifting point to the fixing point 8' of the first end of the rope when the first lifting point LP1' has been lifted to the desired height (point P') in the elevator hoistway.

FIG. 5 presents the end result of the subsequent phase of the method, in which phase of the method each end A',B' of the rope is guided after a lift to its fixing point 8',9' (e.g. a safety gear) and fixed to it. The rope 4' is in this case guided to pass over the diverting pulley 11 of the overspeed governor. In this phase of the method the rope 4' is additionally tightened to its desired final tautness by pulling the slack out with the diverting pulley 12 that is at the bottom end of the hoistway.

In the method for installing the trailing cable 4" of an elevator into the elevator, the hoisting means 6 of the hoisting device 7 presented in FIG. 1 is correspondingly fixed to a first lifting point L1", which is at a distance from the first end A" (but could also alternatively be right at the end of the trailing cable), and the hoisting means 6 is fixed to a second fixing point L2" of the rope 4", which fixing point is at a distance from the second end B" (but could also alternatively be right at the end of the trailing cable). FIG. 6 presents the subsequent phase of the method, in which the trailing cable 4" is lifted in the elevator hoistway 3 by lifting the trailing cable with a hoisting device 7 from the first and second lifting point (L1" and L2") simultaneously, until the first and second lifting point (L1" and L2") are at the desired height (at point P") in the elevator hoistway 3, and the first end A" and the second end B" of the trailing cable 4" are guided to their fixing points (8",9"), and the ends are fixed to their fixing points. When the lifting points are at the desired point P" in the top part of the elevator hoistway, the tails remaining on the second side of the lifting point hang free. The second distance between the end B" of the rope and the second lifting point is in this case preferably at least equal in length to the distance from the second lifting point to the fixing point 9" of the second end of the trailing cable to the elevator car 1 when the second lifting point L2" has been lifted to the desired height (point P") in the elevator hoistway. Correspondingly the first distance between the first end A" of the rope and the first lifting point LP1" is selected to be advantageous, e.g. to be such that additional lifts will not be required. The first distance is thus preferably at least equal in length to the distance from the first lifting point to the fixing point 9" of the first end of the trailing cable when the first lifting point L1" has been lifted to the desired height (point P") in the elevator hoistway. In this case it is easy to guide the ends of the rope to their fixing points with a small number of lifts, quickly and simply.

FIG. 7 presents the end result of the subsequent phase of the method, in which phase of the method each end A",B" of the rope is guided after a lift to its fixing point 8",9" and fixed to it. The rope 4" is in this case guided to hang in the elevator hoistway 3 between the elevator car and the point supported on the building. The hoisting function of the elevator is not shown in FIGS. 4-7. During the lift of the rope 4',4" of FIGS. 4-7, rope is preferably released from the rope reel 5,5', which rope reel is during a lift preferably rotating in a stationary location and is disposed in the proximity of the bottom end of the elevator hoistway, preferably on the first floor landing. The rope reel is preferably according to the description of FIGS. 8-10 and/or to the requirements relating to the rope reel. During a lift the first end A',A" and the second end B',B" rise upwards in the elevator hoistway, and at the same time the section of rope between the lifting points is released from the rope reel.

FIGS. 8 and 9 present a rope reel 5 of an elevator according to the invention. The rope reel comprises a rope 4,4',4" of the elevator, e.g. a hoisting rope, which rope comprises a first end and a second end, and a bending T1 between them and the rope is reeled around the reel frame F such that the sections of rope on the different sides of the bending T1 pass around the reel a plurality of turns in the same direction. The rope is in this way reeled onto the roll such that when discharging rope from the reel by rotating the reel in one direction, the length of the section of rope between the coil and the first end of the rope as well as the length of the section of rope on the side of the coil and the second end of the rope simultaneously increase. The distance between the bending T1 and the first end A is preferably essentially smaller than the distance between the bending and the second end B, in which case the guiding of the second end B simply to the elevator car according to the method described above is enabled in situations, in which the paths of passage of the rope to the fixing points differ greatly from each other.

The rope reel of FIG. 8 is prepared by forming a bending between the ends of the rope, which bending forms a loop. The bending point is placed against the frame of the reel, after which the sections of rope between the bending point and the ends of the rope are reeled onto the roll by rotating the roll in one direction. The sections of the rope on different sides of the bending are guided as a bundle from the bending point to pass around the reel in the same rotation directions. One advantage of the structure presented is that the tails of the rope grow longer when released from the roll simultaneously when reeling the roll open in one direction. The structure presented is additionally such that the sections of rope between the bending point and the ends pass over the bending point pressing the bending point against the frame of the roll, in which case the structure is simple and the bending point is released from the reel last.

FIG. 10 presents a rope reel 5' according to the invention, which rope reel in other respects corresponds to the rope reel of FIGS. 8-9, but the sections of rope on different sides of the bending T2 have been reeled onto the roll in a different way. The sections of rope on different sides of the bending point T2 are guided to pass around the reel separately from each other such that they pass around the reel a plurality of turns at a distance from each other.

The rope reels 5,5' can be prepared by reeling rope onto the roll starting from the section between the ends of the rope. In this case it is easy to arrange both tails of the rope of the reel to separate from the reel in the same rotation direction.

In this application the term hoisting roping refers to a rope, chain, belt or some other corresponding and is arranged/can be arranged to move an elevator car and/or a counterweight. The rope is most preferably, however, a conventional elevator rope such as a metal braided rope. The elevator hoistway 3 is formed preferably inside the building and is preferably vertical. The elevator is preferably a people mover. In this application the aforementioned first and second distance are understood to be measured along the longitudinal axis of the rope.

The invention is suited to be usable e.g. in elevators that comprise a separate machine room or in elevators without a machine room, in which the machinery can be in the same space as the elevator car. In FIGS. 1-3 the border of the machine room is presented with a dashed line, in cases in which it is desired to form an elevator with machine room. In this case it is advantageous to locate the fixing points in the proximity of the floor level of the machine room. The fixing points 8,8',8",9,9',9" presented in the application are most preferably the final fixing points of the rope.

It is obvious to the person skilled in the art that the invention is not limited to the embodiments described above, in which the invention is described using examples, but that many adaptations and different embodiments of the invention are possible within the frameworks of the inventive concept defined by the claims presented below. It is also obvious that the invention can also be utilized e.g. by simultaneously lifting both ropes from the very end, in which case in the follow-on the ends are guided to their fixing points by pulling still more of them. It is also obvious that in an elevator with machine room the point P can be disposed in the actual maneuvering space reserved for the elevator car or on the machine room side.

The invention claimed is:

1. A method for reeving an elevator by guiding first and second ends of at least one hoisting rope to respective fixing points and fixing the first and second ends to the respective fixing points, the method comprising:
    fixing a hoisting element of a hoisting device to a first lifting point of the hoisting rope, the first lifting point being at one of (i) the first end of the hoisting rope and (ii) a first distance from the first end of the hoisting rope;
    fixing the hoisting element of the hoisting device to a second lifting point of the hoisting rope, the second lifting point being at one of (i) the second end of the hoisting rope and (ii) a second distance from the second end of the hosting rope;
    lifting the hoisting rope in an elevator hoistway with the hoisting device until the first lifting point and the second lifting point are at a top part of the elevator hoistway;
    guiding the first end of the hoisting rope to a first of the respective fixing points;
    guiding the second end of the hoisting rope to a second of the respective fixing points;
    fixing the first end of the hoisting rope to the first of the respective fixing points; and
    fixing the second end of the hoisting rope to the second of the respective fixing points.

2. The method according to claim 1, further comprising:
    releasing, while lifting the hoisting rope, a section of hoisting rope between the first and second lifting points from one of a rope reel and another rope storage.

3. The method according to claim 1, wherein
    the lifting lifts the first and second ends of the hoisting rope upwards in the elevator hoistway; and
    the method further includes
        releasing, concurrently with the lifting of the first and second ends of the hoisting rope upwards in the elevator hoistway, a section of the hoisting rope between the first and second lifting points is from one of a rope reel and another rope storage.

4. The method according to claim 1, wherein the second distance is greater than the first distance.

5. The method according to claim 1, further comprising:
    determining, before the lifting of the hoisting rope, lengths of a path of passage of the hoisting rope from a first position of the first lifting point to the first of the respective fixing points and from a second position of the second lifting point to the second of the respective fixing points; and
    selecting the first distance between the first lifting point and the first end, and the second distance between the second lifting point and the second end based on the determined lengths of the path of passage; wherein
        the first position of the first lifting point is a position of the first lifting point after the lifting of the hoisting rope in the elevator hoistway, and
        the second position of the second lifting point is a position of the second lifting point after the lifting of the hoisting rope in the elevator hoistway.

6. The method according to claim 1, further comprising:
    leading the second end of the hoisting rope over a first diverting pulley supported on a building, and downwards to an elevator car; and
    the fixing the second end of the hoisting rope includes one of
        (i) fixing the second end to the second of the respective fixing points, wherein the second of the respective fixing points is on the elevator car, and
        (ii) fixing the second end of the hoisting rope to the second of the respective fixing points after leading the second end of the hoisting rope over a second diverting pulley on the elevator car, wherein the second of the respective fixing points is on a fixed structure of the building.

7. The method according to claim 6, wherein the second distance is greater than or equal to a length of an intended path of passage of the hoisting rope from the first diverting pulley supported on the building to the second of the respective fixing points.

8. The method according to claim 1, wherein at least one of the first and second of the respective fixing points are on a fixed structure of a building.

9. The method according to claim 1, further comprising:
    feeding one of the first and second ends of the hoisting rope over a diverting pulley of a counterweight before one of (i) fixing the hoisting element of the hoisting device to the first lifting point of the hoisting rope and (ii) fixing the hoisting element of the hoisting device to the second lifting point of the hoisting rope.

10. The method according to claim 1, wherein
    the first of the respective fixing points is on a fixed structure of a building; and
    the method further includes
        detaching the first lifting point of the hoisting rope from the hoisting element.

11. The method according to claim 1, wherein
    the second of the respective fixing points is on an elevator car; and
    the method further includes
        guiding the second end of the hoisting rope over a traction sheave to the elevator car, and
        detaching the second lifting point of the hoisting rope from the hoisting element after fixing the second end of the hoisting rope to the second of the respective fixing points.

12. The method according to claim 1, further comprising:
    releasing, during the lifting of the hoisting rope, the hoisting rope from one of a rope reel and another rope storage, the rope reel rotating in a stationary position during the lifting.

13. A method for installing an overspeed governor rope or trailing cable of an elevator the method comprising:
    fixing a hoisting element of a hoisting device to a first lifting point of the overspeed governor rope or trailing cable, the first lifting point being at one of (i) a first end of the overspeed governor rope or trailing cable and (ii) a first distance from the first end;
    fixing the hoisting element to a second lifting point of the overspeed governor rope or trailing cable, the second lifting point being at one of (i) a second end of the overspeed governor rope or trailing cable and (ii) a second distance from the second end;
    lifting the overspeed governor rope or trailing cable in an elevator hoistway with the hoisting device until the first lifting point and the second lifting point are at a desired height in the elevator hoistway;

guiding the first end of the overspeed governor rope or trailing cable to a first fixing point;

guiding the second end of the overspeed governor rope or trailing cable to a second fixing point;

fixing the first end of the overspeed governor rope or trailing cable to the first fixing point; and fixing the second end to the second fixing point.

14. The method according to claim 13, wherein the first lifting point is at the first distance from the first end of the overspeed governor rope;

the second lifting point is at the second distance from the second end of the overspeed governor rope; and the second distance is greater than the first distance.

15. The method according to claim 13, further comprising:

determining, before the lifting of the overspeed governor rope or trailing cable in the elevator hoistway, lengths of a path of passage of the overspeed governor rope or trailing cable from a first position of the first lifting point to the first fixing point and from a second position of the second lifting point to the second fixing point; and selecting the first and second distances based on the determined lengths of the path of passage; wherein the first position of the first lifting point is a position of the first lifting point after the lifting of the overspeed governor rope or trailing cable in the elevator hoistway, and the second position of the second lifting point is a position of the second lifting point after the lifting of the overspeed governor rope or trailing cable in the elevator hoistway.

16. The method according to claim 13, further comprising:

releasing, during the lifting of the overspeed governor rope in the elevator hoistway, a section of the overspeed governor rope between the first and second lifting points from one of a rope reel and another rope storage.

17. The method according to claim 13, wherein the lifting lifts the first and second ends of the overspeed governor rope or trailing cable upwards in the elevator hoistway.

18. The method according to claim 13, wherein the lifting lifts the first and second ends of the overspeed governor rope or trailing cable upwards in the elevator hoistway; and the method further includes releasing, concurrently with the lifting, a section of the overspeed governor rope between the first and second lifting points from one of a rope reel and another rope storage.

* * * * *